(12) United States Patent
J. Maldonado Diaz et al.

(10) Patent No.: US 8,510,234 B2
(45) Date of Patent: Aug. 13, 2013

(54) EMBEDDED HEALTH MONITORING SYSTEM BASED UPON OPTIMIZED NEURO GENETIC FAST ESTIMATOR (ONGFE)

(75) Inventors: Francisco J. Maldonado Diaz, Simi Valley, CA (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 422 days.

(21) Appl. No.: 12/930,418

(22) Filed: Jan. 5, 2011

(65) Prior Publication Data

US 2011/0167024 A1 Jul. 7, 2011

Related U.S. Application Data

(60) Provisional application No. 61/335,355, filed on Jan. 5, 2010.

(51) Int. Cl.
*G06G 7/00* (2006.01)
*G06E 1/00* (2006.01)
*G06E 3/00* (2006.01)
*G06F 15/00* (2006.01)
*G06N 1/00* (2006.01)

(52) U.S. Cl.
USPC .............................................. 706/10; 706/15

(58) Field of Classification Search
None
See application file for complete search history.

(56) References Cited

U.S. PATENT DOCUMENTS 6,489,922 B1 * 12/2002 Lin et al. .................. 342/357.32
6,639,553 B2 * 10/2003 Lin et al. ....................... 342/444
7,948,147 B2 * 5/2011 Carralero et al. ............. 310/311

* cited by examiner

*Primary Examiner* — Michael B Holmes
(74) *Attorney, Agent, or Firm* — Raymond Y. Chan; David and Raymond Patent Firm (57) ABSTRACT

A real time kernel for deploying health monitoring functions in Condition Base Maintenance (CBM) and Real Time Monitoring (RTM) systems is disclosed in this invention. The Optimized Neuro Genetic Fast Estimator (ONGFE) allows embedding failure detection, identification, and prognostics (FDI&P) capability by using Intelligent Software Element (ISE) based upon Artificial Neural Network (ANN). ONGFE enables embedded fast and on-line training for designing ANNs, which perform very high performance FDI&P functions. An advantage is the optimization block based on pseudogenetic algorithms, which compensate for effects due to initial weight values and local minimums without the computational burden of genetic algorithms. It provides a synchronization block for communication with secondary diagnostic modules. Also a scheme for conducting sensor data validation is embedded in Smart Sensors (SS). The algorithms are designed for a distributed, scalar, and modular deployment. The system electronics is built upon a network of smart sensors and a health monitoring computer for providing data acquisition capability and distributed computational power.

22 Claims, 5 Drawing Sheets

EMBEDDED HEALTH MONITORING SYSTEM BASED UPON OPTIMIZED NEURO GENETIC FAST ESTIMATOR (ONGFE)

CROSS REFERENCE OF RELATED APPLICATION

This is a regular application of a provisional application having an application No. 61/335,355 and a filing date of Jan. 5, 2010.

BACKGROUND OF THE INVENTION

1. Field of Invention

The present invention relates to a method for designing health-monitoring systems based upon an optimized embedded kernel for performing FDI&P in CBM and RTM systems. In this invention the Embedded Optimized Neuro Genetic Fast Estimator (ONGFE) instantiates ISEs, which are tailored for conducting FDI&P. Each ISE monitors a system component status. Then health monitoring at the system level is performed by linking ISEs. Distinctive characteristics of the embedded kernel and computational hardware platform are: fast learning; ANN optimization by novel pseudogenetic algorithm; on-line learning; methods for synchronization and communication with secondary diagnostic modules; highly distributed software and hardware architecture; real time operation; and embedded sensor data validation algorithm.

2. Description of Related Arts

Health monitoring (HM) refers to a set of techniques (algorithms) and their implementation, which are used for tracking system operational condition. They aim to achieve high reliability, availability, safety, and maintainability by conducting failure detection and prognostics. Based on this kind of technology maintenance practices, real time monitoring, and depot operation can be enhanced and automated for reducing cost, keeping critical assets in operation, avoiding catastrophic failures, supporting efficient maintenance practices, and managing resources. A particular example is its use for implementation of CBM systems where scheduled maintenance practices are replaced by schemes where maintenance is driven based on the system operational condition instead. Many applications can be listed for exemplifying the technological impact of health monitoring systems. Examples include (among many others) CBM and RTM for: aircraft's engines, ships' turbines, airplane structures, actuators, and on ground vehicles' systems. In the last years, great effort has been conducted by different government agencies promoting research and development in HM, CBM, and RTM. For example, NASA has been strongly supporting the development of novel innovative technologies to detect failures in propulsion systems (engines), exploration platforms, and in different aerospace vehicles. By achieving efficient health monitoring capability then reliable CBM and RTM can be provided.

SUMMARY OF THE PRESENT INVENTION

It is an objective of this invention to provide ISE, which defines operands (data structures) that can be used with operators (instantiated through algorithm implementation) for building health-monitoring functions. Within the scope of this invention an operand corresponds to ANN data (weights, thresholds, number of inputs, hidden units, and number of outputs) and operators correspond to algorithms that process ANN data (examples are learning algorithms, network pruning, fuzzy operators, and network optimization). In this way ISE are arguments to operators for creating a new ISE. The ISEs not only are arguments to ONGFE's operators but also can be processed by new additional algorithms when implementing the health monitoring system.

Another objective of the present invention is to provide a method for embedding different types of health monitoring functions based on ISE for constructing a diversity of real time health monitoring systems. The resulting ISE provides a mechanism for performing failure: (a) Detection; (b) Identification; and (c) Prognostics. Capabilities (a) and (b) can be carried out individually (i.e. a single ISE per function) or both capabilities can be combined in a single ISE. Prognostics will be conducted by a different ISE. Linking ISEs a full set of health monitoring capabilities can be customized for monitoring components, subsystems, and systems.

Another objective of the present invention is to provide very flexible system architecture with the required granularity for inspecting each part that conform to the target system. A scheme that builds on ISEs, distributed hardware, and distributed health monitoring software kernel provides a framework that can be adapted with the required level of detail for extracting system information and deploying diagnostic algorithms in a distributed way.

Another objective of this invention is to provide a method for performing real time failure detection and identification (FDI) in sensor clusters. The ONGFE provides a method for sensor data estimation by processing data from sensor clusters. Sensor cluster data for a given operation range is used for designing an ISE estimator for predicting sensor outputs. Predicted sensor signals can be used for performing residual analysis and determining sensor health.

Another objective of this invention is to provide a method for performing real time FDI in systems and subsystems. The ONGFE provides a method for deploying intelligent elements in computerized and distributed hardware platform based on trained ANN for on-line and real time FDI. These intelligent elements process in real time input features extracted from raw sensor data.

Another objective of this invention is to provide on-line fast learning to allow the ISE to learn to recognize system failures when performing on-line processing. For achieving real time operation in health monitoring systems, a detailed design considering time constraints should be achieved. Then approaching learning by embedding fast algorithms is a required design constraint, which is embedded in this invention.

Another objective of this invention is to provide a scalable HMK with methods (communication and synchronization) for compiling different diagnostic techniques that can work in a collaborative way. A health monitoring processing framework with communication and synchronization mechanisms for interacting with other learning paradigms and diagnostic tools enables (building upon the ONGFE's HMK) compiling diverse techniques within a common framework. In this way, several learning schemes can coexist within a single learning engine.

Another objective of this invention is to provide a scheme for embedding evolving diagnostic capability. This is achieved by: (a) dynamical HMK (which performs ISE instantiation and customization by application of on-line operations); (b) communication and synchronization mechanism; (c) on-line learning; and (d) application program interface (API). In this way mechanisms for discovering new behaviors can be synchronized with the ONGFE's HMK for evolving the ISE's diagnostic capabilities. External conditions can trigger learning for recognizing new health states and adding dynamically new health knowledge (learn-to-learn capability).

Another objective of this invention is to provide ISE with capability to perform failure prognostics. A regression method for time estimation of failure occurrence is provided by ONGFE's ANN designed by using historical data. By applying high performance learning for embedding function approximation capability the resulting ISE performs as a time failure estimator in the prognostic framework.

Another objective of this invention is to provide an optimization process for enhancing ISE's prognostic capability. A population of ANN (each one designed as time failure estimator) is the input to a pseudogenetic algorithm for performing ANN optimization.

Another objective of this invention is to provide a real time distributed, scalar, and modular computational hardware platform for providing a flexible system structure that can be tailored to a wide range of applications.

Additional advantages and features of the invention will become apparent from the description which follows, and may be realized by means of the instrumentalities and combinations particular point out in the appended claims.

According to the present invention, the foregoing and other objects and advantages are attained by a system of health monitoring computer (HMC), adapted for communicating with a target system through a sensor network and collecting health data from the target system, and for interactively communicating with secondary diagnostic modules for the target system, comprising:

an Embedded Health Monitoring based upon Optimized Neuro Genetic Fast Estimator (ONGFE), comprising a communication and synchronization block interactively communicating with the secondary diagnostic modules for the target system;

a Health Monitoring Inference Mechanism (HMIM) communicating with the Optimized Neuro Genetic Fast Estimator (ONGFE), having a plurality of Intelligent Software Elements ISEs which are designed and embedded in the Health Monitoring Inference Mechanism (HMIM) through the Optimized Neuro Genetic Fast Estimator (ONGFE), wherein the Health Monitoring Inference Mechanism (HMIM) is arranged for operatively communicating with the sensor network embedded with ISEs designed by the Optimized Neuro Genetic Fast Estimator (ONGFE), wherein the sensor network is arranged for extracting physical parameters measurements from the target system and generating and inputting the health data including sensor data, status and features to the Health Monitoring Inference Mechanism (HMIM) and Embedded Health Monitoring based upon Optimized Neuro Genetic Fast Estimator (ONGFE), wherein the sensor network comprises a plurality of smart sensors which are customizable according to the target system, wherein a baseline sensor suit of the sensor network is formed with temperature, flow, pressure, and vibration sensors, wherein each of the smart sensors having low power consumption is capable of providing data acquisition, sensor data validation, a library of feature extraction algorithms and communication capabilities, wherein each of the smart sensors comprises a sensor data validation core for signal processing; and a communication block communicating with the Health Monitoring Inference Mechanism (HMIM), wherein the Health Monitoring Inference Mechanism (HMIM) generates health assessments in response to the health data from the sensor network and provides the health assessments to the communication block for feeding Man Machine Interfaces of the target system;

thereby each of the Intelligent Software Elements ISEs, which are designed through the Optimized Neuro Genetic Fast Estimator (ONGFE) which interactively communicates with the secondary diagnostic modules for the target system and the sensor network, is capable of performing one function when the function is prognostic function, and is capable of performing one or more function when the function includes failure detection function and failure identification function.

In accordance with another aspect of the invention, the present invention is a method for conducting data validation in cluster of sensors (correlated sensors) embedded in a smart sensor, which is adapted for communicating with a system of health monitoring computer (HMC) having a Optimized Neuro Genetic Fast Estimator ONGFE, comprising the steps of (a) performing design of sensor signals estimator ISE 631 by using function estimation learning capability of the ONGFE;

(b) performing on-line sensor signals estimation by using the ISE 631 of said ONGFE which has embedded function estimation capability;

(c) generating a residual value vector; and (d) feeding the residual value to said ISE 631 of said ONGFE which has embedded FDI capability 635 for performing sensor health assessment.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

An ensemble of technologies is required for embedding HM capability. Involved technologies include: (a) embedded smart sensors; (b) data processing methods that focus on extracting features or condition indicators from raw data; (c) sensor fusion tools; (d) sensor data validation algorithms; (e) suitable networking software and hardware (vehicle/automotive sensor networks, aircraft data networks, wireless, and LAN communications); (f) real time operating systems; (g) Man Machine Interface (MMI); (h) automated identification technology; (i) enhanced diagnostics and prognostics; and (j) failure trend analysis. Enhancements to the process include data mining (for discovering to new behaviors but also correlations between features (symptoms) and failures) and integration to information systems (configuration management, depot databases, maintenance management automation, and internet servers) to implement CBM-plus type systems.

Key elements in the HM processing framework are (a) enhanced diagnostics and (b) prognostics, which are crucial steps when providing health assessments. The main processing flow consists of sensors collecting component/system data, validation of sensor data, data aggregation, feature extraction, diagnostics, and prognostics for providing health assessments in a MMI.

Figure 1:
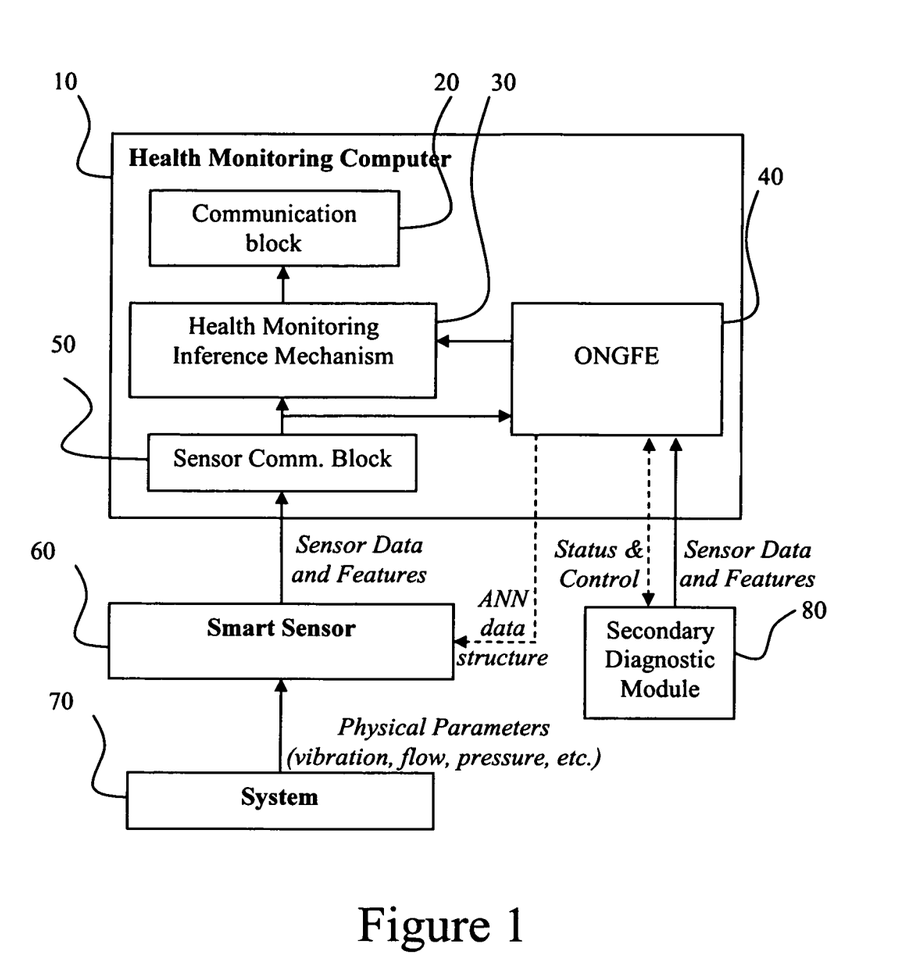
FIG. 1 is a diagram illustrating the components of the Embedded Health Monitoring System based upon Optimized Neuro Genetic Fast Estimator (ONGFE).

Referring to FIG. 1 of the drawings, the ONGFE is a computerized distributed health monitoring kernel (HMK) specifically designed for high performance diagnostics and enhanced prognostics. In the ONGFE kernel, both diagnostics and prognostics are conducted by embedded Artificial Neural Network (ANN) designed on-line with fast learning for achieving real time operation. The prognostic capability is optimized by using a pseudogenetic algorithm in order to embed evolving capability but avoiding a heavy computational load. The system architecture is designed in a distributed way in order to obtain a scalable, modular, and flexible health monitoring system, as shown at FIG. 1.

A flexible HMK that can automatically learn to recognize system failures when the system is in operation is required. On-line fast diagnostic learning and synchronization methods enable recognizing new failures (i.e. self-adaptability capability) for dynamically tailoring the health monitoring capabilities during the system operation. A scalable modular HMK with communication and synchronization methods for compiling different techniques that can work in a collaborative way is also required for enhancing the health monitoring capabilities. Considering sensor data accuracy the ONGFE provides an embedded method for performing sensor data validation. Prognostics of critical failures is a challenging problem and has been approached in several ways. Techniques include Bayesian networks, Kalman Filters, advanced statistical models, among others. But still, needed is a highly reliable solution in order to integrate accurate prognostics. The ONGFE's ANNs provide an optimized regression method for enhanced prognostics. A two-step process is involved: (1) prognostic estimator design is conducted based on ANN and historical data and (2) optimization of the resulting estimators is approached by an innovative pseudogenetic algorithm. Thus, a highly distributed scalable real-time hardware with HMK for high performance and reliable FDI&P is a need for development of robust CBM and RTM systems.

The present invention is based on advanced distributed real time data acquisition, preprocessing algorithms, embedded systems, artificial intelligence, and electronic technologies. As shown at FIG. 1 the ONGFE 40, Health Monitoring Inference Mechanism (HMIM) 30, communication block 20, and Sensor Communication Block (SCB) 50 are embedded in a Health Monitoring Computer (HMC) 10. Smart Sensor (SS) 60 provides transducers (sensor), data acquisition capability, processing capability, sensor data validation, feature extraction algorithms, data log capability, and hardware communications for implementing a real time distributed data acquisition sensor network. Different types of sensors can be attached to the SS 60 for monitoring physical variables of the system (such as vibration, temperature, pressure, flow, etc.). FIG. 1 shows the HMC 10 and a single SS 60. The number of SS 60s that conform to the wireless network is a function of the data acquisition requirements. According to this, then the number of SS 60 is defined, and wireless communication (Zigbee standard) is used for creating a wireless network. Each SS 60 handle up to 8 transducers (sensors) and the maximum sampling period is 200 k samples. Sensor data is collected in the HMC 10. Health information consisting of measurements from sensors, snapshots, and health assessments are fed to customized MMI. For doing this, the HMC 10 provides a communication block 20 for transferring health information through a communication channel (Ethernet, $I^2C$, RS232, and IEEE 802.11 that are embedded in the HMC's communication block 20). In addition to this, the HMC 10 has a Sensor Communication Block 50 (Zigbee, IEEE 802.15.4, $I^2C$, RS-232, and USB are core interfacing mechanisms), which interfaces with the Zigbee coordinator for extracting data from the to wireless network of Smart Sensors. This interface receives sensor data and features from a wireless networks or smart sensors and feeds the HMIM 30 and the ONGFE 40. The HMIM 30 delivers health information consisting of health assessments, measurements, snapshots of sensor data, and row data to the communication block 20 which transfers this information to external devices. The communication block 20 provides a second networking level (in addition to the sensor network level), which allows interconnecting with several HMC 10 to central devices providing a very flexible system structure for deploying hardware and health monitoring algorithms. This system structure is suitable for implementing a system of systems in a scalar, modular, and distributed architecture.

Figure 2:
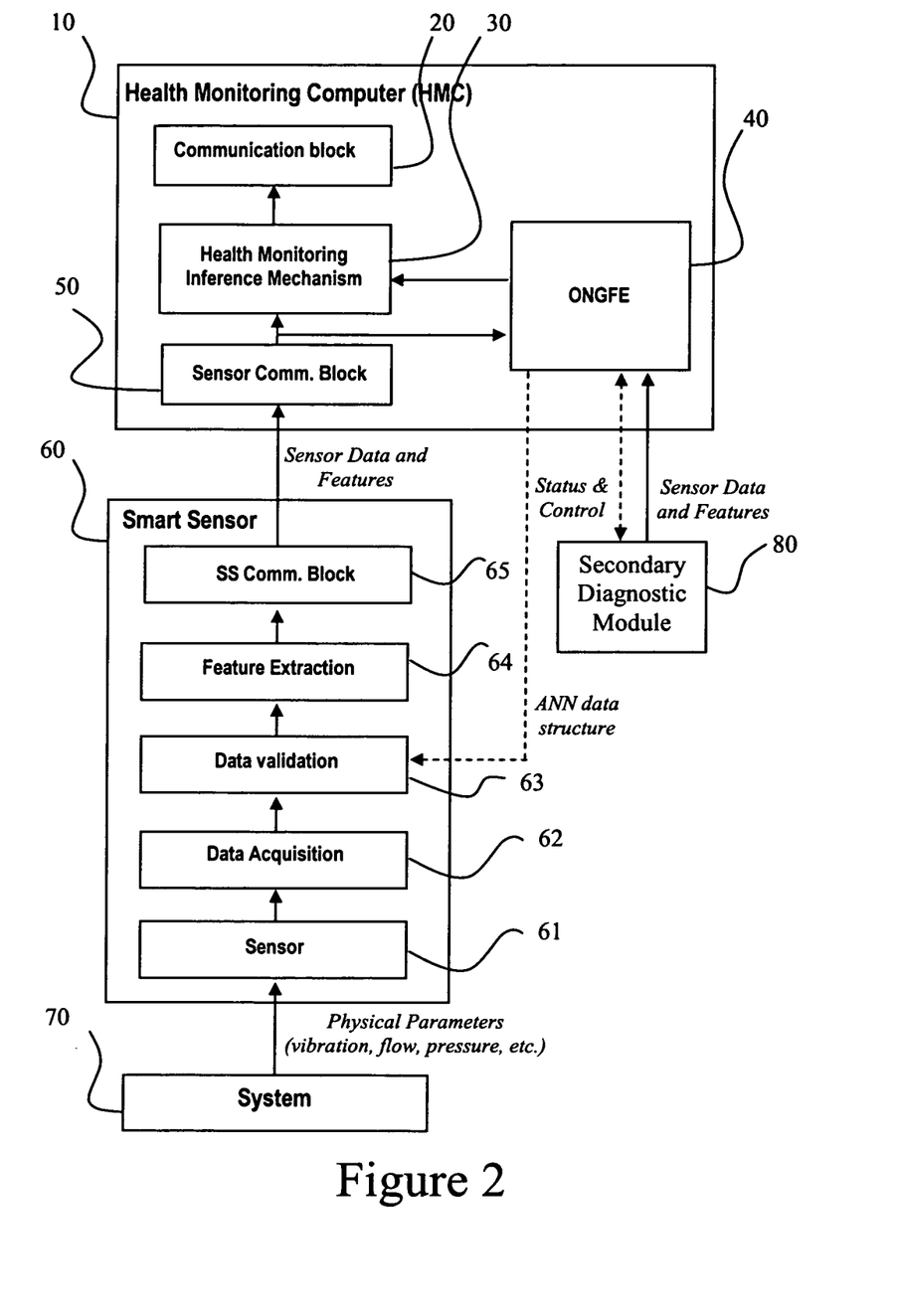
FIG. 2 is a diagram illustrating the components of the Embedded Health Monitoring System based upon Optimized Neuro Genetic Fast Estimator (ONGFE) with the Smart Sensors building blocks, which consist of integrated sensors, data acquisition, data validation algorithms, feature extraction, and Smart Sensor Communication block.
Figure 4:
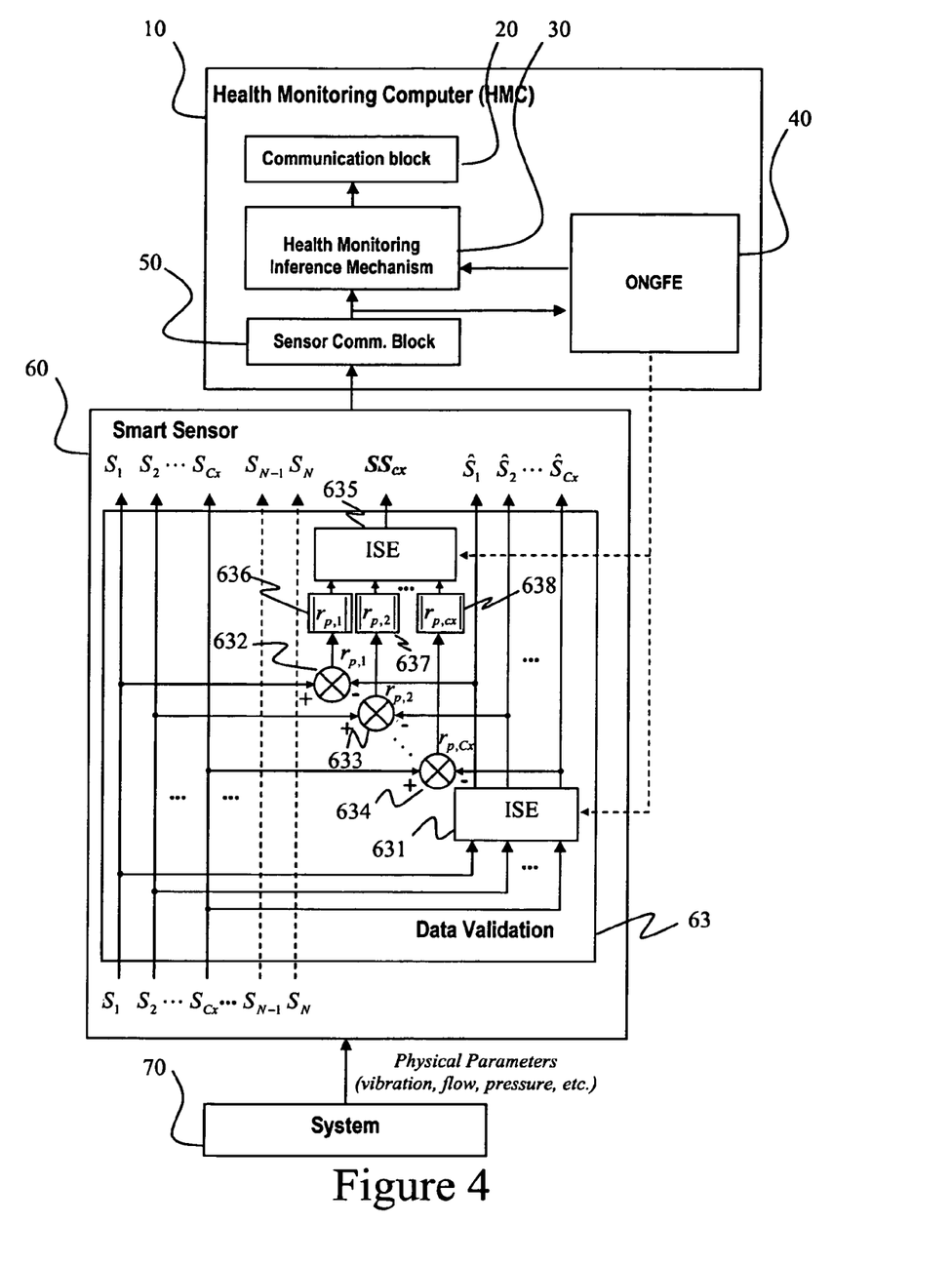
FIG. 4 is a diagram illustrating the sensor data validation scheme for correlated signals in sensor clusters.

Each SS 60 complies to the requirements for ultra low power consumption (with a supply Voltage Range of 1.8 to 3.6 v and 0.7 microamperes in Standby Mode and 200 microamperes at 1 MHZ with 2.2 volts), provide different acquisition modes (single input single sample; sequence of channels single sequence; single input and multiple samples; sequence of channels and multiple sequences), programmable sample period, and retention times. Considering fast sensors (accelerometers for vibration monitoring) sampling periods up to 200 k samples are provided. In FIG. 2 shows the building blocks of the SS 60. Sensors 61 (transducers) provide electrical signals from physical parameters (vibration, flow, pressure, etc.) of the system 70. The sensor 61 provides voltages and currents to the Data Acquisition 62 system, which converts the analog signal into digital data according to the defined sampling period and retention time. After digitizing the signals, the data is processed by the Data Validation block 63. A method for performing sensor data validation in the case of clusters of correlated sensor is embedded within the Data Validation block 63. FIG. 4 shows the structure of this scheme. Then validated data is delivered to the Feature Extraction block 64. For slow sensor (such as temperature and flow) features, that are extracted, consist of rms value, low pass filter of the signal, and first statistics moments. In the case of vibration additional extracted features are crest factor, kurtosis, and main vibration frequencies. Customized algorithms can be embedded. Finally, snapshots of sensor raw data and features are transferred through the Smart Sensor Communication Block (SSCB) 65 to the HMC 10. The SSCB 65 provides different types of communication channels, which include; $I^2C$, RS232, SPI, IEEE 802.15.4, and Zigbee.

There are three main operation modes in the HMC 10. The first one is a normal operation mode, where sensor features and sensor data are processed by ISEs based upon trained ANN (shown at FIG. 5), which conducts FDI&P in the HMIM 30. The second operation mode deals with setting up the system by training and optimization. Fast training 41 is performed to every ISE, both for performing FDI by doing pattern recognition (ISE 31, ISE 32 and ISE 33 in FIG. 3 and ISE 635 in FIG. 4) and the ones that perform function estimation for doing prognostics (ISE 34 in FIG. 3) and sensor data estimation (ISE 631 in FIG. 4). In the case of prognostics an additional step is optimization by pseudogenetic block 43. The third operation mode refers to working in a collaborative way with external diagnostic schemes. A synchronization block 44 is the component that provides methods for interacting with other secondary diagnostic modules (SDM) 80. Interaction capability with SDM 80 combined with on-line real time fast learning schemes 41 enable embedding evolving capability in the Embedded Health Monitoring System based upon ONGFE. Adding knowledge for new failures recognition is achieved by conducting learning in an event trigger base. For example, events can be generated by: (a) the SDM 80 and (b) when the sensor signals or features take a value above a defined red line and the condition does not correspond to a known failure. Once an event is detected then samples of sensor data and corresponding features are used for modifying the intelligent elements in order that they can recognize this new working condition (failure) by retraining the corresponding ISE. In this way, by combining these three operation modes the system can recognize characterized failures as well as learn new unknown conditions by triggering learning.

Figure 3:
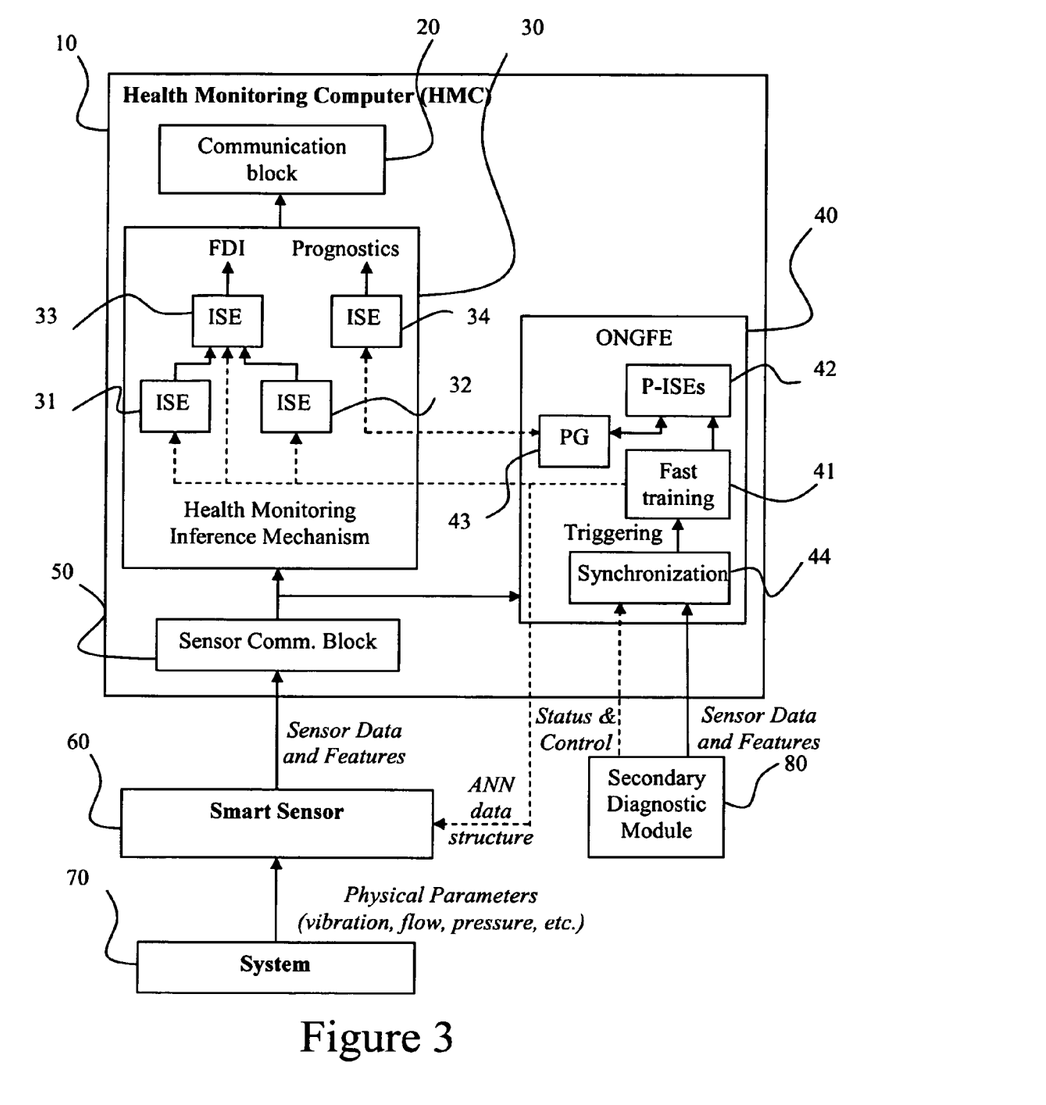
FIG. 3 is a diagram illustrating the components of the Embedded Health Monitoring System based upon Optimized Neuro Genetic Fast Estimator (ONGFE) with the Inference Health Monitoring Mechanism (IHMM) for FDI&P and optimization block.
Figure 5:
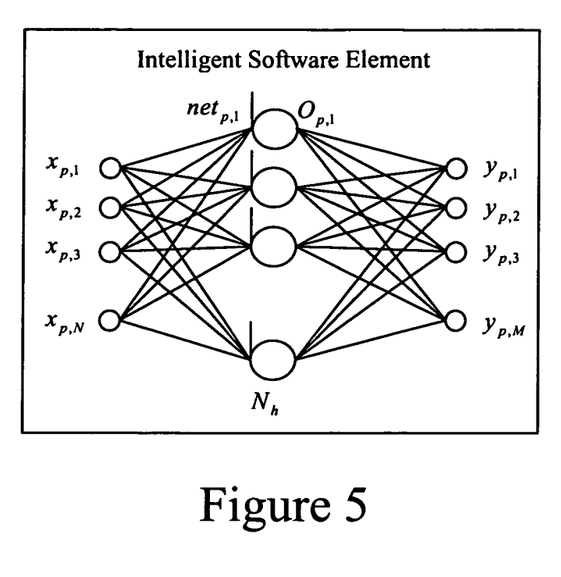
FIG. 5 is a diagram illustrating the Multilayer Perceptron (MLP) that is used for building the Intelligent Software Elements.

In the HMIM each, low level (in the two level structure shown at FIG. 3) ISE is coupled with a component or subsystem. The case of two components and their corresponding ISE is shown at FIG. 3. ISE 31 performs FDI for a first component, and ISE 32 performs FDI for a second component. System monitoring and customization is achieved by linking several intelligent elements. FIG. 3 demonstrates this with ISE 31 and ISE 32, which feeds ISE 33 for performing FDI at the system level. When a failure is recognized by either ISE 31 or ISE 32, then a failure identifier is sent to the ISE 33, which also processes features and sensor data for performing FDI at the system level (failure propagation). These elements (ISE 31, ISE 32, and ISE 33) consist of already trained ANN (from operation mode two or three) that processes in real time features and sensor data at the component level and system level. The structure of the ISE is shown at FIG. 5. According to the figure then each ISE consists of a Multilayer Perceptron (MLP). The number of inputs (N) in the MLP is defined by the number of features and samples of sensor signals. The number of outputs of the MLP it is defined by the number of failures (equal to M−1) to be recognized and an additional output for indication of normal operation. On the other hand considering a time failure estimator, a single output provides the failure prognostic time (M=1). From FIG. 5, the net value and the output value for the $j^{th}$-hidden unit for the $p^{th}$ training pattern are defined as $$net_{p,j} = \sum_{i=1}^{N+1} w(j, i) \cdot x_{p,i}$$

$$1 \leq p \leq N_v, 1 \leq j \leq N_h$$

$$O_{p,j} = f(net_{p,j})$$

Here the threshold of the $j^{th}$ node is handled by defining $x_{p,N+1}$ as one. Weight $w(j,i)$ connects the $i^{th}$ input to the $j^{th}$ hidden unit. The activation function $f$ is the sigmoid function in the units of the hidden layers and linear functions for the units in the output layer. In a two layer MLP the $j^{th}$ output in the hidden layer is given by, $$O_{p,j} = f(net_{p,j}) = \frac{1}{1 + e^{-net_{p,j}}}.$$

The $k^{th}$ output for the $p^{th}$ training pattern is given by, $$y_{p,k} = \sum_{i=1}^{N+1} w_o(k, i) \cdot x_{p,i} + \sum_{j=1}^{N_k} w_o(k, j+N+1) \cdot O_{p,j}$$

$$1 \leq k \leq M$$

The mapping error for the $p^{th}$ pattern is $$E_p = \sum_{k=1}^{M} [t_{p,k} - y_{p,k}]^2,$$

where $t_{p,k}$ denotes the $k^{th}$ element of the $p^{th}$ desired output vector. In order to train a neural network, for one epoch, the mapping error for the $k^{th}$ output unit is defined as $$E(k) = \frac{1}{N_v} \sum_{p=1}^{N_v} [t_{p,k} - y_{p,k}]^2.$$

where $N_v$ is the number of patterns (examples) that form the training data file. The overall performance of a MLP network, measured as Mean Square Error (MSE), can be written as $$E = \sum_{k}^{M} E(k) = \frac{1}{N_v} \sum_{p=1}^{N_v} E_p.$$

Training is conducted by using the OWO-HWO algorithm embedded in the ONGFE's 40 Fast Training Kernell 41, which performs output weight optimization (OWO) in the output layer for finding the weights. Then, the HWO step uses separate error functions for each hidden unit and finds the optimal weights connecting to the hidden units. However, this requires desired hidden net functions, which are not normally available. They can be estimated as $$net_{pd,j} \cong net_{p,j} + Z \cdot \delta_p(j),$$

where $net_{pd,j}$ is the desired net function and $net_{p,j}$ the actual net function for the $j^{th}$ unit and the $p^{th}$ pattern. Z is the learning factor and $\delta_p(j)$ is the gradient of the $j^{th}$ hidden unit activation with respect to its net function.

The error function is given by, $$E_\delta(j) = \frac{1}{N_v} \sum_{p=1}^{N_v} \left[ \delta_p(j) - \sum_{i=1}^{N+1} e_{ji} \cdot x_{p,i} \right]^2,$$

where $e_{ji}$ is obtained solving the following set of equations in the least square sense $$\delta_p(j) \cong \sum_{i=1}^{N+1} e_{ji} \cdot x_{p,i}.$$

In OWO-HWO the hidden weights will be updated by $$w(j,i) = w(j,i) + \Delta w(j,i) = w(j,i) + Z \cdot e_{ji}.$$

In one iteration, the total change in the error function E, due to changes in all hidden weights, can be approximated as $$\Delta E \cong -Z \frac{1}{N_v} \sum_{j=1}^{Nh} \sum_{p=1}^{Nv} \delta_p^2(j).$$

In some cases, the approximation of (last equation) may be invalid. The algorithm checks the convergence in the calculations and if it is necessary it fixes the process when the error increases by restoring previous results and reducing Z.

Prognostics are triggered when a degradation of the sensor readings or feature is recognized. Working with nominal operating points, the expected values of sensor data correlated with system failures are known. For a known operation point with stable conditions selected sensor readings and features are monitored, and trend analysis is perform for detecting degradation in their values. Prognostic is conducted when the starting of a trend is identified, which is conducted by performing function approximation by using an MLP. Statistical data is used for defining the training data file for doing function estimation. At FIG. 3, ISE 34 conducts prognostics by performing function estimation. Then ISE 34 provides an estimate of the remaining useful life of the component or system. Optimization of the prognostic process in the ISE 34 is performed by the ONGFE 40. As shown at FIG. 3, the algorithm works with a Population of MLPs (P-ISE) 42. This population is processed by a Pseudogenetic (PG) block 43. The embedded algorithm is based on a modified version of the Schmidt procedure (with the purpose of reducing execution time within the pseudogenetic algorithm). This form of the Schmidt process makes it possible to obtain expressions for the output error of the network as a function of the number of units being pruned. Here the $m^{th}$ orthonormal basis function $x_m'$, can be expressed as $$x_m' = \sum_{k=1}^{m} a_{mk} x_k. \tag{1}$$

From equations (1) with m=1, the first basis function is obtained as $$x_1' = \sum_{k=1}^{1} a_{1k} x_k = a_{11} x_1, \tag{2}$$

$$a_{11} = \frac{1}{\|x_1\|} = \frac{1}{r(1,1)^{1/2}},$$

where r(1,1) is the first element of the autocorrelation matrix and $$r(i,j) = E[x_i \cdot x_j] = \frac{1}{N_v} \sum_{p=1}^{Nv} x_{p,i} \cdot x_{p,j}$$

From equation (1) with m=2, the second basis function is $$x_2' = \sum_{k=1}^{2} a_{2k} x_k = a_{21} x_1 + a_{22} x_2, \tag{3}$$

but also $$x_2' = \frac{z_2}{\|z_2\|} \Rightarrow \tag{4}$$

$$z_2 = x_2 - c_1 x_1' = x_2 - c_1 a_{11} x_1$$

(with $c_1 = \langle x_1', x_2 \rangle$), we can say, $$z_2 = \sum_{k=1}^{2} b_k x_k = b_1 x_1 + b_2 x_2, \tag{5}$$

where from (4) and (5), $$b_1 = -c_1 a_{11}$$

$$b_2 = 1.$$

Defining "g" as the denominator of $x_2'$ then, $$g^2 = \langle x_2 - c_1 x_1', x_2 - c_1 x_1' \rangle \tag{6}$$

$$= r(2,2) - c_1^2,$$

so that from equations (3), (5) and (6), $$x_2' = a_{21} x_1 + a_{22} x_2 = \frac{b_1 x_1 + b_2 x_2}{g}, \tag{7}$$

$$a_{21} = \frac{b_1}{g} = \frac{-c_1 a_{11}}{(r(2,2) - c_1^2)^{1/2}}$$

$$a_{22} = \frac{b_2}{g} = \frac{1}{(r(2,2) - c_1^2)^{1/2}},$$

with $$c_1 = \langle x_1', x_2 \rangle = E[x_1' \cdot x_2] = a_{11} r(1,2)$$

$$a_{11} = \frac{1}{\|x_1\|}.$$

For the third basis function (m=3), $$x_3' = \sum_{k=1}^{3} a_{3k} x_k = a_{31} x_1 + a_{32} x_2 + a_{33} x_3, \tag{8}$$

but also

-continued $$x'_3 = \frac{z_3}{\|z_3\|} \Rightarrow$$

$$z_3 = x_3 - c_1 x'_1 - c_2 c'_2 =$$
$$= (-c_1 a_{11} - c_2 a_{21})x_1 - c_2 a_{22} x_2 + x_3,$$

with $$c_1 = \langle x'_1, x_3 \rangle = E[a_{11} x_1 x_3]$$
$$= a_{11} r(1, 3)$$

$$c_2 = \langle x'_2, x_3 \rangle = E[(a_{21} x_1 + a_{22} x_2) x_3] =$$
$$= a_{21} r(1, 3) + a_{22} r(2, 3).$$

The numerator in (8) is now, $$z_3 = \sum_{k=1}^{3} b_k x_k = b_1 x_1 + b_2 x_2 + b_3 x_3, \quad (9)$$

where from (8) and (9), $$b_1 = -c_1 a_{11} - c_2 a_{21}$$

$$b_2 = -c_2 a_{22}$$

$$b_3 = 1.$$

Generalizing, $$b_k = -\sum_{n=k}^{m-1} c_n a_{nk}$$

$$k = 1, 2, \ldots, m-1$$

$$b_m = 1,$$

Defining "g" as the denominator of $x_3'$, $$g^2 = \langle x_3 - c_1 x'_1 - c_2 x'_2, x_3 - c_1 x'_1 - c_2 x'_2 \rangle, \quad (10)$$
$$g = (E[x_3^2] - c_1^2 - c_2^2)^{1/2}$$
$$= (r(3, 3) - c_1^2 - c_2^2)^{1/2}.$$

From equations (8), (9) and (10)

$$x'_3 a_{31} x_1 + a_{32} x_2 + a_{33} x_3 = \frac{b_1 x_1 + b_2 x_2 + b_3 x_3}{g}, \quad (11)$$

$$a_{31} = \frac{b_1}{g} = \frac{-c_1 a_{11} - c_2 a_{21}}{(r(3,3) - c_1^2 - c_2^2)^{1/2}}$$

$$a_{32} = \frac{b_2}{g} = \frac{-c_2 a_{22}}{(r(3,3) - c_1^2 - c_2^2)^{1/2}}$$

$$a_{33} = \frac{b_3}{g} = \frac{1}{(r(3,3) - c_1^2 - c_2^2)^{1/2}},$$

with $$c_1 = \langle x'_1, x_3 \rangle = a_{11} r(1, 3)$$
$$c_2 = \langle x'_2, x_3 \rangle = a_{12} r(1, 3) + a_{22} r(2, 3),$$

where $a_{11}$ is defined by (2) and $a_{21}$, $a_{22}$ are defined by (7)

From equation (11), the $c_j$ factors can be obtained in the following way. For getting the "i" basis function, there will be a number equal to "i−1" of $c_j$ factors, which can be obtained using $$c_n = \sum_{k=1}^{n} a_{nk} r(k, m) \quad \text{with} \quad 1 \leq n \leq m-1$$
$$m > 1,$$

For the third basis function (m=3) there will be two $c_j$ factors, $c_1$ and $c_2$.

Now we have the coefficients $a_{nk}$ for $1 \leq n \leq m-1$, $1 \leq k \leq n$ where m=3. The remaining orthogonal basis functions, described as in (1), are found inductively as follows. First coefficients $b_k$ are found as, $$\begin{cases} b_k = -\sum_{n=k}^{m-1} c_n a_{nk} & 1 \leq k \leq m-1 \\ b_k = 1 & k = m. \end{cases}$$

Then $a_{mn}$ is found for $1 \leq n \leq m$ as $$a_{mn} = \frac{b_n}{\left[ r(m, m) - \sum_{k=1}^{m-1} c_k^2 \right]^{1/2}}.$$

Working with the orthogonalized system is possible to obtain the error of the original network. From this derivation it is obtained expressions that let us predict the error of the NN for different sizes. Also, from this equations, estimation of the energy of the network can be accomplished. We can express the error in the $i^{th}$ output node as, $$E(i) = E\left[ \left( t_i - \sum_{k=1}^{Nu} w'_o(i, k) x'_k \right) \left( t_i - \sum_{m=1}^{Nu} w'_o(i, m) x'_m \right) \right], \quad (12)$$

$$= E[t_i^2] - 2 \sum_{k=1}^{Nu} w'_o(i, k) E[x'_k t_i] + \sum_{k=1}^{Nu} (w'_o(i, k))^2,$$

Applying least square estimation we can get that $$w'_o(i, m) = E[x'_m t_i]. \quad (13)$$

Now using equation (1) we get, $$w'_o(i, m) = \sum_{k=1}^{m} a_{mk} E[x_k t_i] = \sum_{k=1}^{m} a_{mk} c(i, k), \quad (14)$$

where c(i,k) is the an element of the crosscorrelation matrix defined as $$c(i, k) = E[x_k \cdot t_i] = \frac{1}{Nv} \sum_{p=1}^{Nv} x_{p,k} t_{p,i}.$$

From equations (12) and (13), the MSE at the $i^{th}$ node is $$E(i) = E[t_i^2] - \sum_{k=1}^{Nu} (w'_o(i,k))^2. \tag{15}$$

Equation (15) is an exact result. It can be used for prediction of the error of the Neural Network. This can be done when eliminating useless basis functions X' and with this equation, estimating the expected error after pruning the network. Also, working with these output weights the energy handled in the basis functions can be obtained.

In this way, working with the orthogonal system the effect of each basis function over the error of the ANN can be estimated. For transforming the weights in the original NN from the orthogonalized system, considering the previous results we can say that, $$y_i = \sum_{k=1}^{Nu} w_o(i,k)x_k = \sum_{m=1}^{Nu} w'_o(i,m)x'_m.$$

Working with the right hand side equation, and using equation (1)

$$\sum_{m=1}^{Nu} w'_o(i,m)x'_m = \sum_{m=1}^{Nu} w'_o(i,m)\sum_{k=1}^{m} a_{mk}x_k,$$

Changing the upper limit from "m" to "$N_u$" and rearranging the sums, $$y_i = \sum_{k=1}^{Nu} w_o(i,k)x_k = \sum_{k=1}^{Nu}\left[\sum_{m=1}^{Nu} w'_o(i,m)a_{mk}\right]x_k.$$

With $a_{mk}=0$ if k>m, equation (4.40) becomes $$y_i = \sum_{k=1}^{Nu} w_o(i,k)x_k = \sum_{k=1}^{Nu}\left[\sum_{m=1}^{Nu} w'_o(i,m)a_{mk}\right]x_k, \tag{16}$$

and $$w_o(i,k) = \sum_{m=k}^{Nu} w'_o(i,m)a_{mk}.$$

Using equation (16) we get the weights in the original domain of the network.

In the modified orthogonalization process defined from page 16 line 12 to page 20 line 13, raw basis functions are processed into orthonormal basis functions in natural order. In other words, the $m^{th}$ orthonormal basis function is formed from the $m^{th}$ raw basis function. In this part the process is generalized, so that arbitrary ordering is allowed. Let j(m) be an integer valued function that specifies the order in which raw basis functions $x_k$ are processed into orthonormal basis functions $x_k'$. In other words, $x_m'$ is to be formed from $x_{j(m)}$. Note that $1 \leq m \leq N_u$ and $1 \leq j(m) \leq N_u$. Generalizing the process defined at page 16 line 12 to page 20 line 13, the $m^{th}$ orthonormal basis function is described as $$x'_m = \sum_{k=1}^{m} a_{mk}x_{j(k)}. \tag{17}$$

Given the function j(k), we find $a_{11}$ for the basis function $x_1'$ as $$a_{11} = \frac{1}{\|x_{j(1)}\|} = \frac{1}{r(j(1),j(1))^{1/2}}.$$

For the function $x_2'$, $a_{21}$ and $a_{22}$ are found as $$a_{21} = \frac{-c_1 \cdot a_{11}}{g},$$

$$a_{22} = \frac{1}{g},$$

where $$c_1 = a_{11}r(j(1),j(2)),$$

$$g = (r(j(2),j(2)) - c_1^2)^{1/2},$$

For basis functions $x_m'$ for m=3, 4, ..., $N_u$ coefficients $a_{mk}$ are found next.

Now, assume that we have coefficients $a_{nk}$ for $1 \leq n \leq m-1$ and $1 \leq k \leq n$. The $c_n$ coefficients are found as $$c_n = \sum_{k=1}^{n} a_{nk}r(j(k),j(m))$$

$$1 \leq n \leq m-1,$$

The $b_k$ coefficients are found as $$b_k = -\sum_{n=k}^{m-1} c_n a_{nk},$$

$$b_m = 1,$$

for $1 \leq k \leq m-1$. Finally new coefficients $a_{mn}$ are found as $$a_{mn} = \frac{b_n}{\left[r(j(m)j(m)) - \sum_{k=1}^{m-1} c_k^2\right]^{1/2}}.$$

for $1 \leq n \leq m$.

Selection of hidden units is performed by estimation of the basis function effect over the error or the network. The basis functions are ordered, and according to the desired size of the hidden layer then the first neurons are selected for conforming to the hidden layer of the network. The goal in this subsection is to get the function j(m) which defines the order of the hidden units according to the concentration of the energy. Here we assume that the original basis functions are not linearly dependent.

The process is done in the following way. First, define S(m) as the set of indices of basis functions that have been chosen, through the $m^{th}$ one.

$$S(m) = \begin{cases} \{\phi\} & \text{for } m = 0 \\ \{j(1), j(2), \ldots, j(m)\} & \text{for } m > 0, \end{cases}$$

Its complement $S^c(m)$ is the set of $$S^c(m) = \{1,2,3,\ldots,N_u\} - S(m) \quad (18)$$

where $S^c(m-1)$ is the set of candidate BFs for the $m^{th}$ iteration. At the $m^{th}$ iteration there will be m−1 ordered BF that are defined by the function values $j(1)$ through $j(m-1)$. During the execution of the $m^{th}$ iteration $j(m)$ will take several values, the ones that comes from $S^c(m-1)$. At the end of the iteration, $j(m)$ will take its value from the raw BF that keeps the most of the energy and $S(m)$ is updated according to $$S(m) = S(m-1) \cup \{j(m)\}. \quad (19)$$

Because we are interested in finding the most important hidden units basis functions, and are not interested in eliminating any inputs, the first N+1 basis functions are picked as, $$j(k) = k \text{ for } 1 \leq k \leq N+1,$$

Then for m=N+2, getting the first hidden BF since full connectivity is considered, the values of $j(1)$ to $j(N+1)$ correspond to the input units and threshold at the output layer and they are known. Here $S(N+1)$ and $S^c(N+1)$ are, $$S(m-1) = S(N+1) = \{1, 2, \ldots, N, N+1\} = \{j(1), j(2), \ldots, j(N+1)\},$$

$j(1)$ to $j(N)$ correspond to the network inputs and $j(N+1)$ corresponds to the threshold. And the candidates BF are $$S^c(N+1) = S^c(m-1) = \{1, 2, 3, \ldots, N_u\} - S(m-1).$$
$$= S^c(m-1) = \{N+2, N=3, \ldots, N_u\},$$

where $S^c(m-1)$ has $N_h$ elements. For testing the candidate BF $j(m)$ takes on all values in $S^c(N+1)$ and after finding the BF that keeps the most of the energy then $j(m)$ takes its value and $S(m)$ is updated according to (19) as $$S(m) = S(N+2) = S(N+1) \cup \{j(N+2)\} = \{j(1), j(2), \ldots, j(N+1), j(N+2)\}.$$

For m=k the candidates BF are, $$S^c(k-1) = \{1,2,3,\ldots,N_u\} - \{j(1), j(2), \ldots, j(k-1)\},$$

with $N_u - k + 1$ candidate BF. After testing all the candidate BF, $j(k)$ takes its value and $$S(k) = S(k-1) \cup \{j(k)\} = \{j(1), j(2), \ldots, j(k)\}.$$

This is repeated until $m = N_u$, and in this way the values of the function $j(m)$ are found.

For doing the previous process it is necessary to estimate the energy for the $m^{th}$ candidate BF. This is done in the following way, $$P(m)|_{j(m) \in S^c(m-1)} = \sum_{i=1}^{M} [w_o'(i,m)]^2, \quad (20)$$

where the value of the energy is a function of the previous m−1 ordered BF and the BF that it is tested. In equation (20) P(m) is the energy of the $m^{th}$ BF, where the $m^{th}$ tested BF belongs to $S^c(m-1)$. In this way we are looking to concentrate the energy in the first BFs. Then doing this and from equation (15) we obtain a method for doing pruning of the hidden units since the last columns of equation (15) (i.e. last BFs) will contribute with the smallest amount in the summation, second term of equation (15), and then it is expected that eliminating these BFs (hidden units) the error of the NN is not affected in a large amount.

P(m) is obtained for all the candidates BF defined by (18). It should be observed that for applying equation (20), obtaining coefficients $a_{k1}$ from equation (17) is required. Then using these coefficients and the crosscorrelation matrix in equation (14) the new $w_o'(i,j)$ weights (columns of the output weight matrix) can be obtained. In this way knowing $a_{00}$ the weights that correspond to the first column of the output weight matrix (energy of the first BF) can be obtained. In the same way, knowing $a_{10}$ and $a_{11}$ the second column of $w_o'(i,k)$ can be calculated, and so on.

The general idea and behavior of the Pseudogenetic Algorithm based upon the standard Schmidt procedure is similar to the one used in Genetic Algorithms (GAs), which is an optimization technique based in the simulation of the natural law of the evolution of species by natural selection, where only the fittest individual will be able to reproduce, handing down its chromosomes while the less fit will suffer extinction. Both work with a population of ANNs but in the proposed method the operations over the population are different. The representation of the population is not a string, but a set of weight matrices, but the behavior of the new networks (sons) is similar to the original ones. From the functionality point of view there is some similitude between one of the proposed operations with the reproduction and crossover operation of the GAs' together. Because of this our method is called a pseudogenetic algorithm.

In the proposed algorithm, once that the new ANN are created they are analyzed by the modified Schmidt Procedure and then the best units of the new networks are selected.

Define the $k^{th}$ input network $N_k$ as $$N_k = \{N, M, N_h^k, W^k, W_o^k, F\}.$$

Here the superscript k defines the number of the network. N defines the number of inputs, M the number of outputs, $N_h^k$ is the number of hidden units, $W^k$ is the weight matrix of the first layer, and $W_o^k$ is the output weight matrix of the $k^{th}$ network. F is the training data file. The weight matrix of the first layer has dimension $N_h^k \times (N+1)$, while $W_o^k$ is a matrix of dimension $M \times (N + N_h^k + 1)$.

In the proposed pseudogenetic algorithm there are two operations to be used on the population, which are defined in the following way. The combine operation generates a new network, which inherits in some degree the behavior of the parents. Given two networks $N_k$ and $N_i$, the combine operation is written as, $$N_c \leftarrow \text{Combine}\{N_k, N_i\}, \quad (21)$$

the result of this operation is a network with the following definition, $$N_c = \{N, M, N_h^c, W^c, W_o^c, F\},$$

$$\text{where } W^c = \begin{bmatrix} W^k \\ W^i \end{bmatrix}_{(N_h^i + N_h^k) \times (N+1)},$$

$$N_h^c = N_h^i + N_h^k.$$

Here the new combined network will have the same number of inputs and the same number of outputs. The number of hidden units will be equal to $N_h^i + N_h^k$. $W^c$ is gotten adding more rows to the combined network setting to zero the elements of these rows and then copying the right values to the new network.

The output weight matrix is obtained adding zeros (columns) to $W_o^k$ then the weights are added that correspond to the hidden units of $W_o^i$. Finally $W_o^c$ is found applying OWO to the combined network.

The second operation is the pruning operation.

$$N_a \leftarrow \text{Prune}\{N_k, N_{hd}\}, \quad (22)$$

it performs the pruning of a given $N_k$ network reducing the number of hidden units to $N_{hd}$, where $N_{hd}$ is the desired number of hidden units. Here $N_k$ has $N_{hd}$ or more hidden units. The process is done according to the procedure described in page 24 line 4 (to page 26 line 20) where first the units of the output layer are ordered and then the first $N_{hd}$ units (the best since it is expected that the most of the energy is concentrated in this units) are kept.

Assume that the number of inputs, outputs, and hidden units is the same in the whole population. The general idea in the first algorithm is to combine the input network $N_n$ with the best previous network, obtaining a combined net with $2 \cdot N_h$ hidden units. Then this network is pruned to the original size of $N_h$ hidden units.

The best network at iteration k is selected among the incoming network, the previous best network (selected at iteration k−1) and the pruned network (at iteration k). In the case of the first iteration (k=1), the first input network $N_1$ is also the best network.

The algorithm can be expressed in the following way:

1.—Generate λ neural networks (population), and define k=1. Then the population={$N_1, N_2, \ldots, N_\lambda$}.
2.—Input network $N_k$. For k=1 go to step 5.
3.—Using expression 21 combine network $N_k$ with the previous best network $N_B$. Then $N_c \leftarrow \text{Combine}\{N_k, N_B\}$.
4.—Get the pruned network, using expression 22. Here $N_{hd}$ is equal to $N_h$, i.e. $N_a \leftarrow \text{Prune}\{N_c, N_{hd}\}$.
5.—Select the best network out of the; input ($N_k$), pruned ($N_a$), and the previous best one ($N_B$). For k=1 the pruned network is equal to $N_1$.
6.—Increment k, and if k is not greater than λ go to step 2.

By using the fast training block 41 a scheme for performing sensor data validation (shown in FIG. 4) is also included as part of the Embedded Health Monitoring System. The fast training block 41 executes the algorithm described from page 14 line 13 to page 15 line 17 for designing a sensor signal estimator (ISE 631). Also comparators 632-634, absolute value generators 636-638, and a FDI block 635 (ISE) are part of the sensor data validation scheme. The estimator (ISE 631) can be optimized by using ONGFE's 40 pseudogenetic algorithm as described from page 16 line 11 to page 29 line 14. Assuming a cluster with $C_x$ correlated signals, which are extracted from the system 70, the validation process is conducted in the following way. After digitization of the input analog sensor signals 61 the Data Acquisition block 62 provides data to the Data Validation block 63. Referring to FIG. 4 $C_x$ correlated signals ($S_1, S_2, \ldots, S_{cx}$) are considered as input to ISE estimator 631 in the form of a vector input ($x_p$) containing $C_x$ elements (where p corresponds to the sampling number). The ISE 631 generates an output vector $y_p$ whose elements are the estimates ($\hat{S}_1, \hat{S}_2$, and $\hat{S}_{cx}$) of the corresponding input signals. The elements of the output vector are used for comparing the estimated value with the actual sensor signal value. The first sensor signal estimate $y_{p.1}$ (equal to $\hat{S}_1$) is input to comparator 632. Also, to this comparator is fed the actual sensor signal value ($S_1$,). The output of the comparator 632 feeds the absolute value generator 636. Then output of the absolute value generator 636 defines the element $|r_{p,1}|$ which is fed to the FDI ISE 635. The process is repeated for each sensor signal in the cluster. Referring to FIG. 4 the second signal estimate $y_{p.2}$ (equal to $\hat{S}_2$) feeds comparator 633 as well as the actual sensor signal value ($S_2$). After the absolute value generator 637 a second element ($|r_{p,2}|$) is obtained and driven to the FDI ISE 635. The last signal estimate provided by $y_{p.cx}$ (equal to $\hat{S}_{Cx}$) feeds the comparator 634. This estimate and the actual sensor signal value ($S_{cx}$) are used for generation of the last element. After the absolute value generator 638 then $|r_{p,cx}|$ feeds the FDI ISE 635. In this way a vector $|r_p|$, whose elements are the absolute residual values ($|r_{p,1}|, |r_{p,2}|, \ldots, |r_{p,cx}|$) is processed by the FDI ISE 635 for determining the sensor data quality. According to the result of the sensor data validation process an output code is generated ($SS_{cx}$) to flag and identify the sensor data condition. Sensor data, estimated values, and the binary code are delivered in the output of the Data Validation block 63. $SS_{cx}$, is a code defined by $C_x+1$ bits (or elements in an array). $C_x$ bits are used for signaling the condition of the $C_x$ sensors (a single bit per sensor). An additional bit is used for handling the normal operation condition of the cluster. In addition to the FDI ISE 635 the data validation block also compares the absolute value of each residual ($|r_{p,1}|, |r_{p,2}| \ldots, |r_{p,cx}|$) value with a threshold value ($S_{Th1}, S_{Th2}, \ldots S_{Thcx}$) for detecting a potential sensor failure. In this way when: $|r_{p,1}| > S_{Th1}$ or $|r_{p,2}| > S_{Th2} \ldots$ or $|r_{p,cx}| > S_{Thcx}$ then it is considered that a red line condition has been generated and then by identifying which residual value is larger than the corresponding threshold the potential faulty sensor is identified.

For performing the process addressed from page 29 line 15 to page 30 line 23 key blocks are the estimator ISE 631 and the FDI ISE 635. The design of the estimator ISE 631 and FDI ISE 635 involve the generation of a data training structure (that can also be defined in the form of data training file). In this way by using this data training structure and ONGFE both ISEs can be designed.

The data generation process for designing the estimator ISE 631 can be defined as follows. An initial characterization process is carried out by conducting a sweeping process of the physical parameter that drives the sensor within the target operation range for normal sensor operation. Take $N_{v1}$ samples of the input sensor signal values within the operational range, where each sample defines the vectors $x_p$ (where $1 < p < N_{v1}$). $N_{v1}$ patterns can be defined according to the following format with $y_p = x_p$:

$$p_p = \{x_p, y_p\} = \left\{ \begin{bmatrix} x_{p,1} \\ x_{p,2} \\ \vdots \\ x_{p,N} \end{bmatrix}, \begin{bmatrix} y_{p,1} \\ y_{p,2} \\ \vdots \\ y_{p,M} \end{bmatrix} \right\} \quad (23)$$

The process can be defined by working with a single sensor in the cluster and considering two failure types (for example bias and noise). Seed the first sensor failure (for example in the case of bias by adding a voltage value in the sensor signal or adding an offset value to the digitized signal). Take $N_{v2}$ samples of the input sensor signal values within the operational range, where each sample defines the vectors $x_p$ (where $1 < p < N_{v2}$). To each vector $x_p$ include $y_p$ to form a pattern vector $p_p$ according to expression 23. In this case $y_p$ contains the expected sensor signals without failure. Seed the second sensor failure (for example noise by adding a random signal to the digitized sensor value). In a similar way as in the first seeded failure, obtain $N_{v3}$ patterns. At the end a training data file with $N_v=N_{v1}+N_{v2}+N_{v3}$ patterns are obtained and can be used for training the estimator ISE 631. Additional failures (from the lab or detected on line) can be appended for training the estimator ISE 631.

In the case of the data generation for the FDI ISE 635 the process can be defined (in a similar way as when working with the estimator ISE 631) by working with a single sensor in the cluster and considering two failure types (for example bias and noise). After designing the estimator ISE 631, an initial characterization process is carried out by conducting a sweeping process of the physical parameter within the target operation range for a normal sensor operation. Record the $N_{v1}$ readings. Generate a vector $|r_p|$ for each reading (where $|r_p|=|r_{p,1}|, |r_{p,2}| \ldots , |r_{p,cx}|$). Each vector $|r_p|$ defines a vector with N elements, where N is the number of sensors in the cluster ($C_x$) and p identifies the pattern number (where $1 \leq p \leq N_{v1}$). Patterns can be defined according to the following format:

$$p_p = \{x_p, \text{Class\_Id}\} = \left\{ \begin{bmatrix} x_{p,1} \\ x_{p,2} \\ \vdots \\ x_{p,N} \end{bmatrix}, \text{Class\_Id} \right\} \text{ with } x_p = |r_p| \quad (24)$$

Where Class_Id is a number that identifies the sensor operating condition. For a sweep with healthy sensors set Class_Id equal to 1. Seed the first sensor failure (for example bias, by adding a voltage value in the sensor signal or adding an offset value to the digitized signal). Perform a second sweep and take $N_{v2}$ samples of the input sensor signal values within the operating range, where each sample defines the vectors $x_p$ (where $1<p<N_{v2}$). For each vector $x_p$ obtain the vector $|r_p|$. Add a Class_Id value (set to two) to form patterns $p_p$ (with subindex $1<p<N_{v2}$), as defined in expression 24. Seed the second sensor failure (for example noise by adding a random signal to the digitized sensor value). In a similar way as in the first seeded failure, obtain $N_{v3}$ patterns and keeping the same Class_Id (equal to two). At the end a training data file with $N_v=N_{v1}+N_{v2} N_{v3}$ patterns is obtained and can be used for training the estimator ISE 631. Additional failures (from the lab or detected on line) can be appended for training the estimator ISE 631.

To design the sensor signal estimator ISE 631 the training data structure generation process described for the case of a single sensor addressed from page 31 line 6 to page 32 line 2 can be repeated for characterization of additional sensors in the cluster.

To design the FDI ISE 635 the training data structure generation process described for the case of a single sensor addressed from page 32 line 3 to page 33 line 2 can be repeated for characterization of additional sensors in the cluster. Class_id should be changed for working with the $n^{th}$ sensor, where for the $n^{th}$ sensor Class_id=n+1. Combination of sensor failures can be also considered, where each combination define a new Class_id.

To design the sensor signal estimator ISE 631 the training data structure generation process described for the case of a single sensor addressed from page 31 line 6 to page 32 line 2 can be repeated for characterization of additional failures in a single sensor within the cluster.

To design the FDI ISE 635 the training data structure generation process described for the case of a single sensor addressed from page 32 line 3 to page 33 line 2 can be repeated for characterization of additional failures in a single sensor within the cluster.

To design the sensor signal estimator ISE 631 the training data structure generation process described for the case of a single sensor addressed from page 31 line 6 to page 32 line 2 can be conducted on-line by using the synchronization and communication mechanism 44 for triggering training and feeding data associated with the new detected condition).

To design the FDI ISE 635 the training data structure generation process described for the case of a single sensor addressed from page 32 line 3 to page 33 line 2 can be conducted on-line by using the synchronization and communication mechanism 44 for triggering training and feeding data associated with the new detected condition).

The scheme described from page 29 line 15 to page 34 line 2 for a single cluster can be duplicated following the same process as many times as the number of clusters (with correlated signals) in a single SS 60.

The features of the present invention are summarized as follows:

1. The ONGFE 40 is a computerized distributed health monitoring kernel built upon advanced learning with characteristics that include: (a) designed for developing embedded applications; (b) fast learning algorithm; (c) very high performance; (d) optimization by pseudogenetic algorithm; (e) distributed processing; (f) synchronization and communication mechanisms; (g) scalable; (h) modular; and (e) expandable.

2. The ONGFE 40 has the capability of performing pattern recognition and function approximation. The ONGFE 40 embeds the desired capability into ISE which can be distributed among the Embedded Health Monitoring System. By performing pattern recognition ISE can conduct failure (a) detection and (b) identification, where a single function can be embedded in an ISE or both. By performing function approximation the ISE can perform regression and in this way provide failure prognostics assessments.

3. The ONGFE 40 provides ISE optimization by executing a pseudogenetic algorithm.

4. The ONGFE 40 provides synchronization and communication capability for interacting with secondary diagnostic modules 80, which can drive ONGFE's internal blocks and functions. ONGFE provides health data and status that can drive SDM. In this way different diagnostics schemes can be blended with ONGFE for implementing schemes where synergy and collaborative behaviors can be created.

5. A scalar, modular, and very flexible hardware architecture provides a distributed computational platform for deploying and customizing the Embedded Health Monitoring System. The system structure is depicted in FIG. 1.

6. The Embedded Health Monitoring System builds on Smart Sensors with very low power consumption and standard hardware interfaces (wireless and wired).

7. The EHMS based upon ONGFE provides a sensor data validation scheme for FDI in correlated sensors clusters.

8. The ONGFE provides a very flexible framework with fine system granularity (software and hardware) that enables tailoring FDI functions among components, subsystems, and system level.

9. The ONGFE provides a solid processing structure for real time applications because of its hierarchical and highly distributed architecture (software and hardware).

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A system of health monitoring computer (HMC), adapted for communicating with a target system through a sensor network and collecting health data from the target system, and for interactively communicating with secondary diagnostic modules for the target system, comprising:

an Embedded Health Monitoring based upon Optimized Neuro Genetic Fast Estimator (ONGFE), comprising a communication and synchronization block interactively communicating with the secondary diagnostic modules for the target system;

a Health Monitoring Inference Mechanism (HMIM) communicating with said Optimized Neuro Genetic Fast Estimator (ONGFE), having a plurality of Intelligent Software Elements ISEs which are designed and embedded in said Health Monitoring Inference Mechanism (HMIM) through said Optimized Neuro Genetic Fast Estimator (ONGFE), wherein said Health Monitoring Inference Mechanism (HMIM) is arranged for operatively communicating with the sensor network embedded with ISEs designed by said Optimized Neuro Genetic Fast Estimator (ONGFE), wherein said sensor network is arranged for extracting physical parameters measurements from the target system and generating and inputting the health data including sensor data, status and features to said Health Monitoring Inference Mechanism (HMIM) and Embedded Health Monitoring based upon Optimized Neuro Genetic Fast Estimator (ONGFE), wherein the sensor network comprises a plurality of smart sensors which are customizable according to the target system, wherein a baseline sensor suit of the sensor network is formed with temperature, flow, pressure, and vibration sensors, wherein each of the smart sensors having low power consumption is capable of providing data acquisition, sensor data validation, a library of feature extraction algorithms and communication capabilities, wherein each of the smart sensors comprises a sensor data validation core for signal processing; and a communication block communicating with said Health Monitoring Inference Mechanism (HMIM), wherein said Health Monitoring Inference Mechanism (HMIM) generates health assessments in response to the health data from the sensor network and provides the health assessments to said communication block for feeding Man Machine Interfaces of the target system;

thereby each of said Intelligent Software Elements ISEs, which are designed through said Optimized Neuro Genetic Fast Estimator (ONGFE) which interactively communicates with the secondary diagnostic modules for the target system and the sensor network, is capable of performing one function when the function is prognostic function, and is capable of performing one or more function when the function includes failure detection function and failure identification function.

2. The system, as recited in claim 1, wherein said communication block includes IEEE 802.11.x, 100G Ethernet, and USB as core communication channels arranged for transferring data, including the health data, the health assessments and the data of failure prognostics functions, to Man Machine Interface other central or local computer.

3. The system, as recited in claim 2, further comprising a Sensor Communication Block (SCB) having protocols including Zigbee, IEEE 802.15.4, I$^2$C, RS-232, and USB and comprising communication channels interacting with the sensor network which generates data packages which is capable of providing snapshots of vibration signals in which time and sensor measurements are provided per sample; measurement of temperature, pressure, and flow associated with time and measurement magnitude; status information with data validation; identification number of the smart sensors; Channel number; and checksum value.

4. The system, as recited in claim 3, wherein said ISE defines an Artificial Neural Network (ANN) which corresponds to an operand, wherein the operand is a data structure which defines: number of inputs; number of hidden units; number of outputs; input weight matrix; and output weight matrix, thereby said ISEs are operands to a plurality of ONGFE functions which performs: instantiation, initialization, on-line training, network testing, network error calculation, processing input vectors, pruning, combining networks, and ANN optimization by pseudogenetic algorithm.

5. The system, as recited in claim 4, wherein said ONGFE further comprises a fast training block and a pseudogenetic block, wherein said ONGFE designs and embeds fast learning algorithm to said health monitoring computer (HMC) for applying functions to said ISEs of said health monitoring inference mechanism (HMIM) for defining high performance ISEs, wherein said fast training block is capable of performing: on-line learning for updating and designing ISE data structures of said ISEs; instantiation and training of said ISEs for performing pattern recognition; instantiation and training of said ISEs for performing function approximation; instantiation of a population of said ISEs for defining P-ISEs; instantiation of said ISEs in said HMIM; and instantiation of said ISEs in said Smart Sensors, wherein said Pseudogenetic block of said ONGFE is arranged for evolving said ISEs for optimization.

6. The system, as recited in claim 5, wherein said ONGFE further comprises an optimization block that performs ISE optimization by executing a preset pseudogenetic algorithm stored in said optimization block, wherein a preset population of said P-ISE is first instantiated by said fast training block, and then evolved through said pseudogenetic block for conducting network optimization to provide resulting ISEs which can be embedded in said HMIM for enhanced prognostics and said Smart Sensors for enhanced sensor value estimation.

7. The system, as recited in claim 6, wherein said fast training block includes a preset algorithm which is preformed through said fast training block for designing and defining a pattern recognition ISE for said resulting ISEs, such that said resulting ISEs can be embedded in said HMIM for performing FDI at a component level which is defined as component ISEs (ISE 31 and ISE 32), as well as at a system level by fusing the health data at component level which is defined as system ISEs (ISE 33), wherein said resulting ISEs can be embedded in said HMIM for providing failure prognostic, which is defined as prognostic ISE (ISE 34), through said fast training block for function approximation to define an output ISE which can be embedded in said Smart Sensor for performing sensor data validation.

8. The system, as recited in claim 7, wherein each said component ISEs (ISE 31 and ISE 32) is deployed for one preset component in such a manner that said system is capable of being expanded through adding additional component ISEs.

9. The system, as recited in claim 8, wherein said system ISE (ISE 33) performs system level FDI such that said HMIM can be reproduced following the same structure for performing FDI in additional systems.

10. The system, as recited in claim 9, wherein said a synchronization block of said ONGFE is arranged for interaction with an external SDM and MMI such that the external SDM can trigger learning features of said ONGFE, wherein said synchronization block further defines two types of operations, which are input synchronization operations and output synchronization operations, wherein said input synchronization operations includes: starting execution of on-line training; reading SDM's health data package (raw sensor data, features, failure, and training data structure); and reading SDM status information, wherein said output synchronization operations includes: sending status information of said ONGFE; writing health data package of said ONGFE; and writing said status information of said ONGFE.

11. The system, as recited in claim 10, wherein said fast training block and said Synchronization block of said ONGFE enable implementing evolving capability in the Health Monitoring System by triggering a learning process when new conditions are recognized by said ONGFE.

12. The system, as recited in claim 11, wherein said fast training block and said Synchronization block 44 of said ONGFE 40 enable implementing diagnostics schemes in such a manner that said ONGFE can interact in real time with said Secondary Diagnostic Modules and said ONGFE is capable of creating synergy and collaborative behaviors in response to said Secondary Diagnostic Modules.

13. The system, as recited in claim 12, wherein said Smart Sensor is a toolbox with a core set of feature extraction algorithms embedded therein, wherein said feature extraction algorithms are; energy signal value (rms); kurtosis; crest factor; FFT; inverse FFT; and statistical indexes (such as mean, variance, and covariance).

14. The system, as recited in claim 13, wherein said Smart Sensor embeds a method for conducting data validation in cluster of sensors (correlated sensors), wherein said method comprises the steps of:
(a) performing design of sensor signals estimator ISE 631 by using function estimation learning capability of said ONGFE;
(b) performing on-line sensor signals estimation by using ISE 631 of said ONGFE which has embedded function estimation capability;
(c) generating a residual absolute value vector $|r_p|$ where each element $|r_{p,x}|$ is obtained by the absolute value of the difference of $S_x - \hat{S}_x$; and
(d) feeding said absolute values of each residual element $r_{p,x}$ obtained in step (14.c) from absolute value generators of said smart sensor to said ONGFE which has embedded FDI capability 635 for performing sensor health assessment.

15. The system, as recited in claim 14, wherein said smart sensor further comprises a data validation 63 block which includes a red line anomaly detection for FDI in the cluster sensor, where for each $i^{th}$ sensor in the cluster, the corresponding residual value ($|r_{p,i}|$) is compared with a threshold value $S_{Thi}$ such that when the absolute value of the residual value is bigger than the threshold value, a red line condition is defined and flagged.

16. The system, as recited in claim 15, wherein said Smart Sensor 60 is used for forming a network that provides a first level of said system, wherein each said smart sensor 60 provides data acquisition, data validation, feature extraction, and communication capability, wherein said Smart Sensor comprises a communication block 65 which provides wireless communication (Zigbee) and wired networking schemes ($I^2C$, RS232, and SPI) in such a manner that the Smart Sensor is capable of performing as wireless smart sensor and is capable of connecting through a common bus for implementing a wireless or wired network.

17. The system, as recited in claim 16, wherein said HMC 10 collects sensor data and features from the Smart Sensor Network and feeds the sensor data and features to said HMIM for conducting FDI&P, wherein said Communication Block 20 is capable of communication at system and subsystem level such that a plurality of said HMC 10 is capable of being linked to the central computer which provides a second level of networking.

18. A method for conducting data validation in cluster of sensors (correlated sensors) embedded in a smart sensor, which is adapted for communicating with a system of health monitoring computer (HMC) having a Optimized Neuro Genetic Fast Estimator ONGFE, comprising the steps of:
(a) performing design of sensor signals estimator ISE 631 by using function estimation learning capability of the ONGFE;
(b) performing on-line sensor signals estimation by using the ISE 631 of said ONGFE which has embedded function estimation capability;
(c) generating a residual absolute value vector $|r_p|$ where each element $|r_{p,x}|$ is obtained by the absolute value of the difference of $S_x - \hat{S}_x$; and
(d) feeding said absolute values of each residual element $r_{p,x}$ obtained in step (18.c) from absolute value generators of said smart sensor to said ONGFE which has embedded FDI capability 635 for performing sensor health assessment.

19. The method, as recited in claim 18, wherein in said step (a) further comprising the steps of:
(a.1) sweeping physical parameter that drives the sensor output within the target operating range for normal sensor operation and record $N_{v1}$ readings, wherein each of the readings defines a vector $x_p$ (where $1 < p < N_{v1}$) with $C_x$ elements, where $C_x$ is the number of sensors in the cluster;
(a.2) working with each said vector $x_p$ to form a preset pattern as defined by expression (23) with $y_p = x_p$;
(a.3) adding said preset pattern in the step (a.2) to a training data file;
(a.4) considering the first failure case, seeding the failure in the system, sweeping the physical parameter that drives the sensor output within the target operating range and record $N_{v2}$ readings, wherein each of the readings defines a vector $x_p$ where $1 < p < N_{v2}$;
(a.5) working with each of the vector $x_p$ resulting from the sweeping process of the step (a.4) to form the preset pattern in which $y_p$ is defined as a correct sensor output measurement that corresponds to a given physical parameter value;
(a.6) adding the resulting patterns for the first failure case from the step (a.5) to the training data file;
(a.7) repeating the steps (a.4), (a.5), and (a.6) for every desired failure to be characterized for generating a resulting training data file;
(a.8) using the resulting training data file from the step (a.7) to instantiate an ISE of said ONGFE and training the ISE by using a Fast training block 41 of the ONGFE, wherein the fast training block 41 includes a preset algorithm which is preformed through said fast training block for designing and defining a function approximation ISE for said ISE.

20. The method, as recited in claim 18, wherein the step (c) further comprises the steps of:
- (c.1) performing data acquisition of sensor signals from the cluster by data acquisition block 62 of the smart sensor;
- (c.2) feeding the sensor signals to the estimator ISE 631 of the smart sensor for generation of sensor estimation values;
- (c.3) defining and feeding the first sensor estimated value $\hat{S}_1$ into comparator 632 of the smart sensor;
- (c.4) obtaining and feeding actual sensor value $S_1$ into the comparator 632 to generate the residual value $r_{p,1}$;
- (c.5) feeding the residual value $r_{p,1}$ into absolute value generator 636 of the smart sensor;
- (c.6) feeding $|r_{p,1}|$ into FDI ISE 635 of the smart sensor;
- (c.7) repeating the steps (c.3), (c.4), (c.5) and (c.6) for each $i^{th}$ sensor signal, where $1 \leq i \leq C_x$, being $C_x$ the number of sensors in the cluster, that form the cluster and obtain the residual absolute value $|r_{p,i}|$; and
- (c.8) obtaining a vector $r_p$ from the step (c.7) with elements defined by the residual absolute values $|r_{p,i}|$.

21. The method, as recited in claim 18 wherein the step (d) further comprises the steps of:
- (d.1) sweeping the physical parameter that drives the sensor output within the target operating range for normal sensor operation and record $N_{v1}$ readings and generating a residual absolute vector for each reading, wherein each said residual absolute vector defines a vector $|r_p|$ with $C_x$ elements, where $C_x$ is the number of sensors in the cluster and p identifies the pattern number (where $1 \leq p \leq N_{v1}$);
- (d.2) working with each vector $|r_p|$ to form a second set of preset pattern and setting a class id of the second set of preset pattern to 1;
- (d.3) adding the second set of preset patterns from the step (d.2) to a second training data file;
- (d.4) considering the first failure case, seeding the first failure case into the system, sweeping physical parameter that drives the sensor output within the target operating range and recording $N_{v2}$ readings to generate a residual vector for each of the readings, wherein each of the readings defines a vector $|r_p|$ where $1 < p < N_{v2}$;
- (d.5) working with each of the vectors $|r_p|$ resulting from the sweeping process to form the second preset pattern, defining and setting the class Id to two;
- (d.6) adding the second set of preset pattern from the step (d.5) to the second training data file;
- (d.7) repeating steps (d4), (d.5), and (d.6) for every desired failure to be characterized, and keeping the class identification number for the sequence of failure cases which are included in the second preset pattern;
- (d.8) repeating steps (d4), (d.5), (d6), and (d.7) for every desired failure to be characterized in a different sensor, and increasing the class identification number in sequence according to the sensor number; and
- (d.9) using the resulting training data file to instantiate a ISE 635 and train the ISE 635 by using ONGFE 40 of the system.

22. The method, as recited in claim 21, wherein the ONGFE 40 comprises a synchronization and communication mechanism 44 for triggering training and feeding data associated with a detected condition such that said ISE 631 is capable of performing the step (d) in a remotely controlled manner through a wireless network.

* * * * *